July 5, 1966  H. W. GROTEWOLD  3,259,253
FRUIT TRANSFER MECHANISM
Original Filed April 23, 1958  8 Sheets-Sheet 1
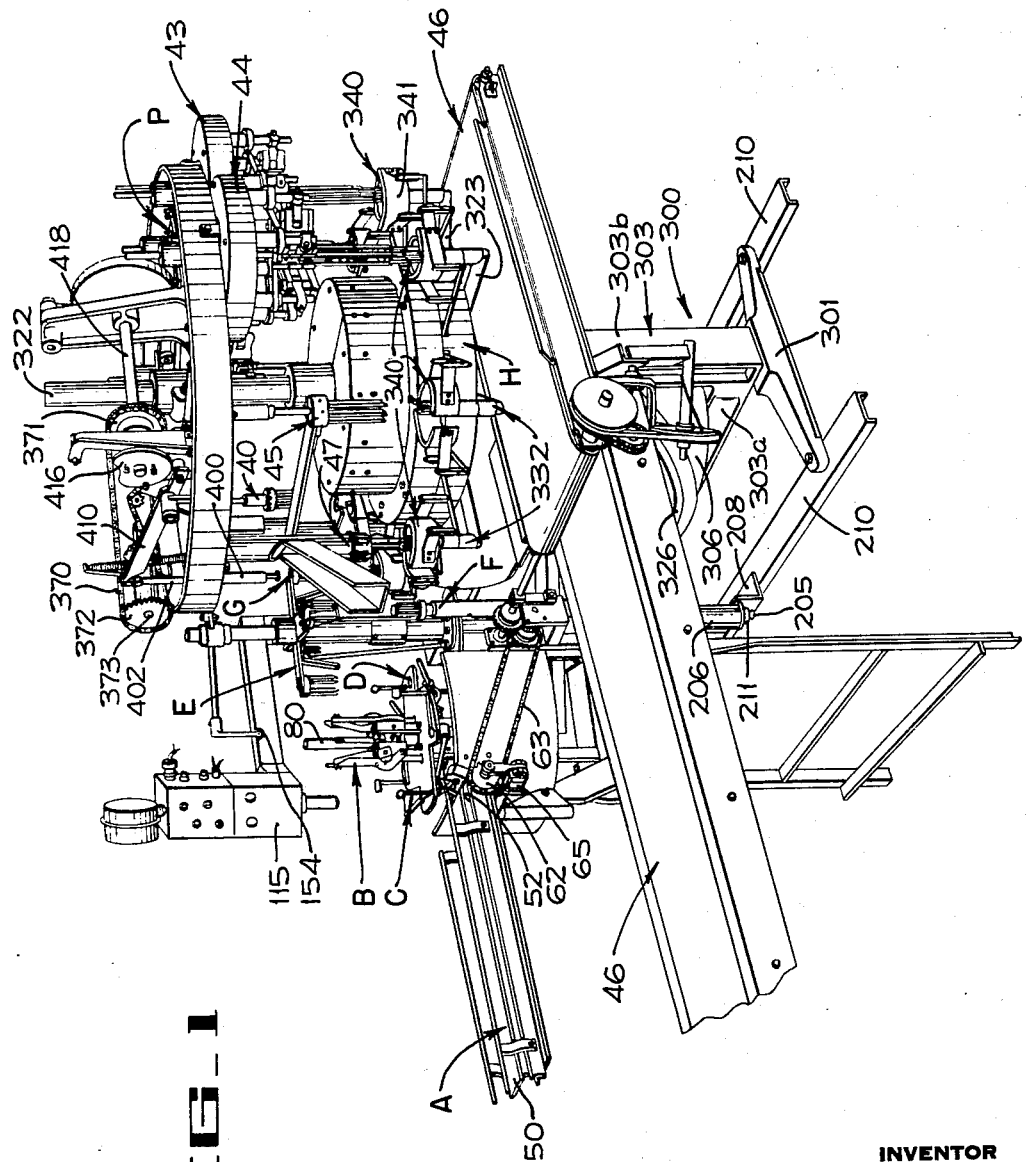
FIG_1
INVENTOR
HANS W. GROTEWOLD
BY
ATTORNEY

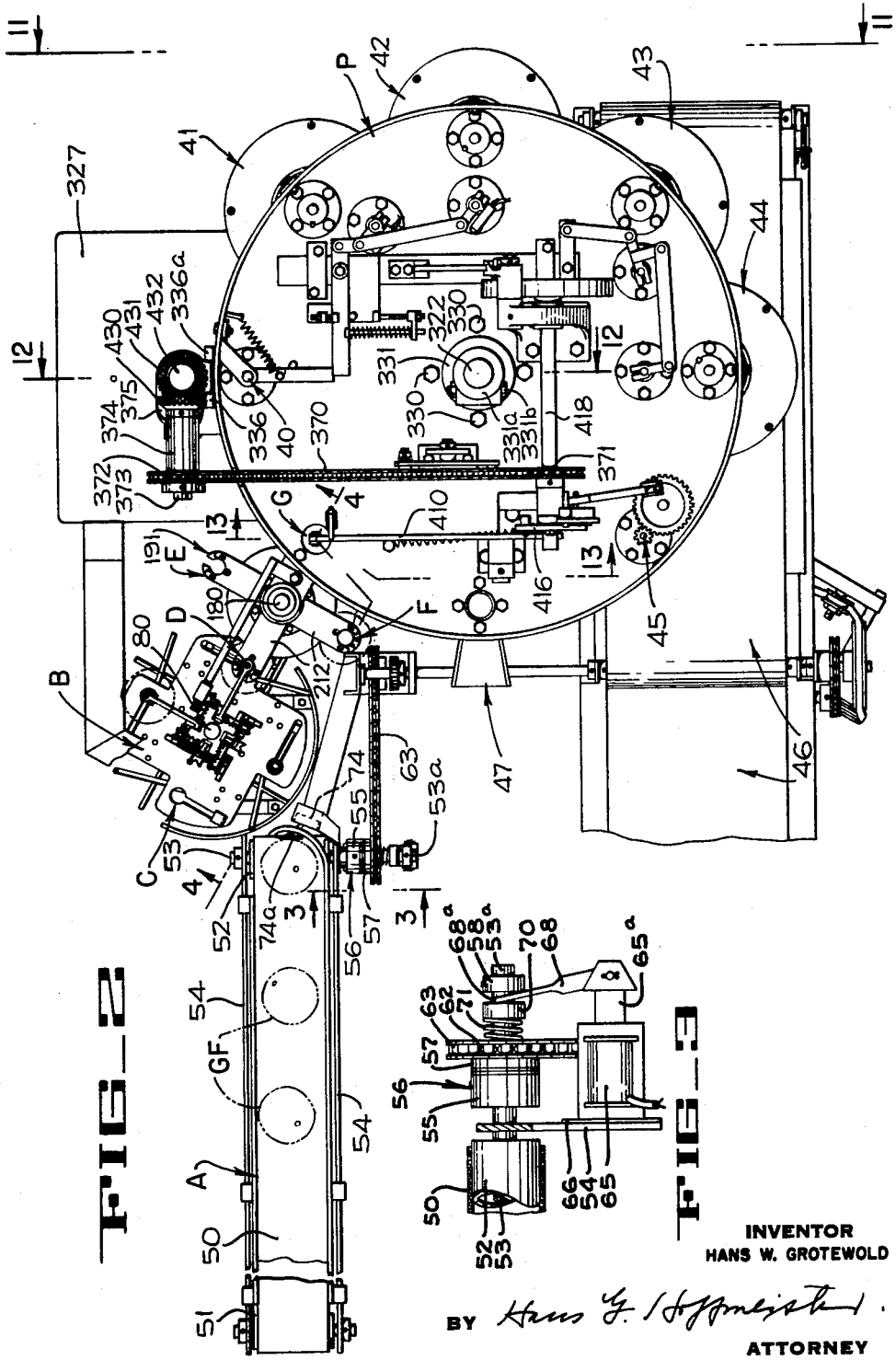

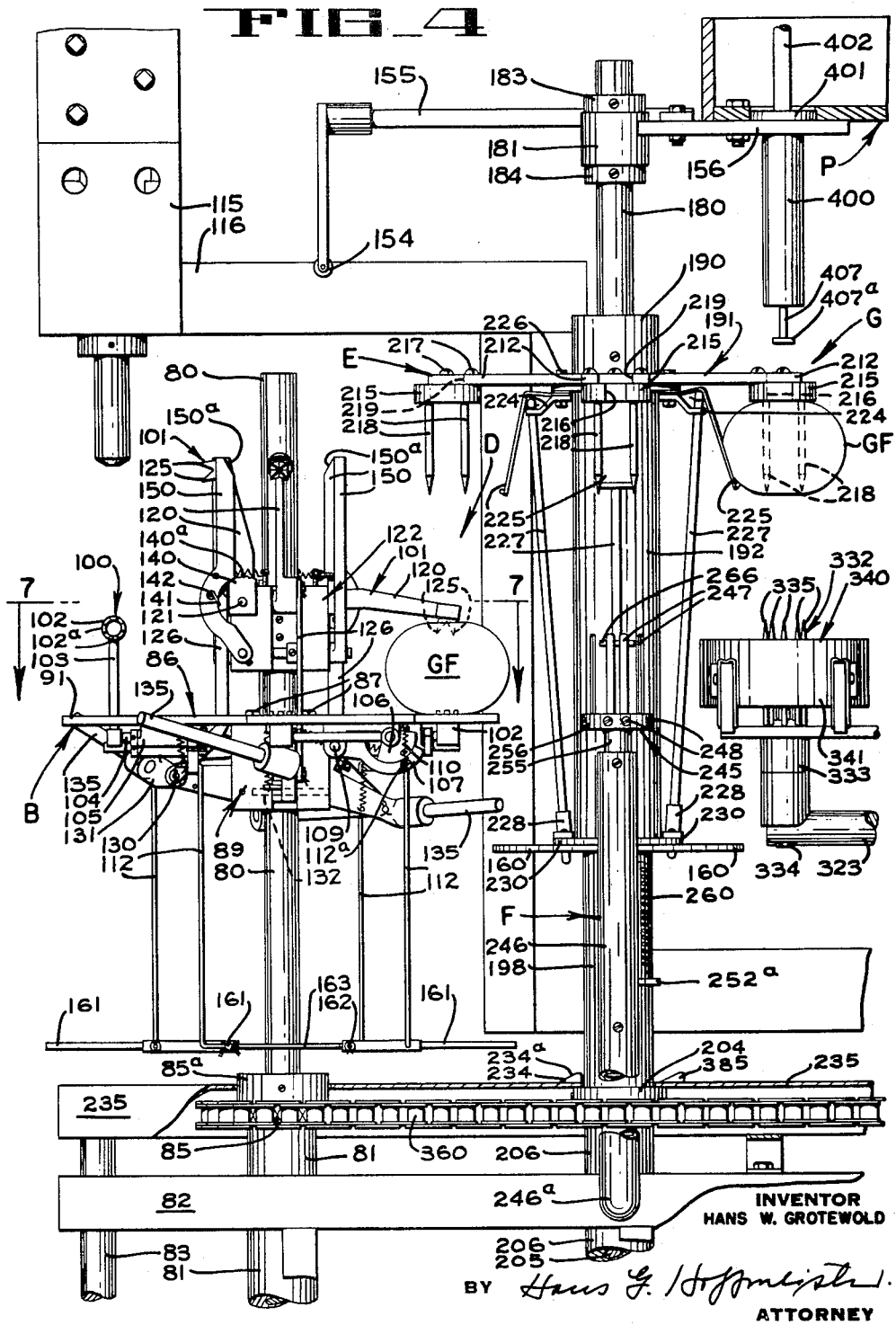

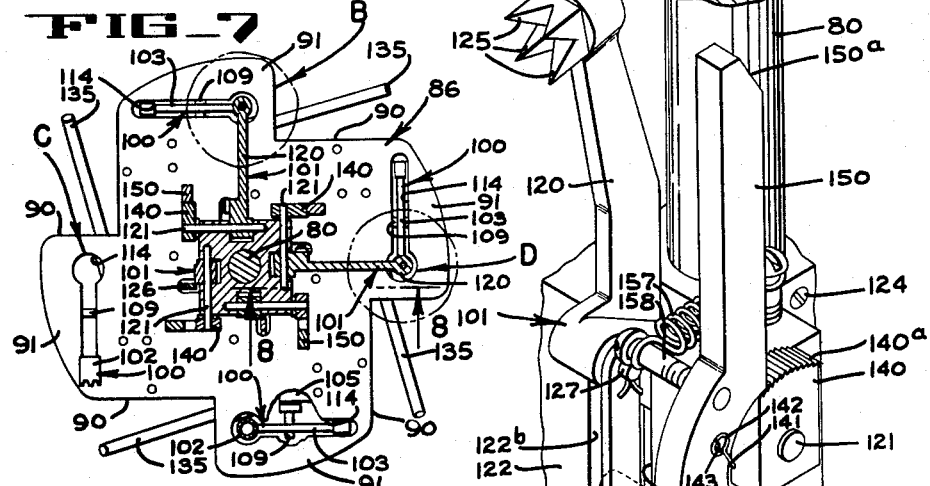

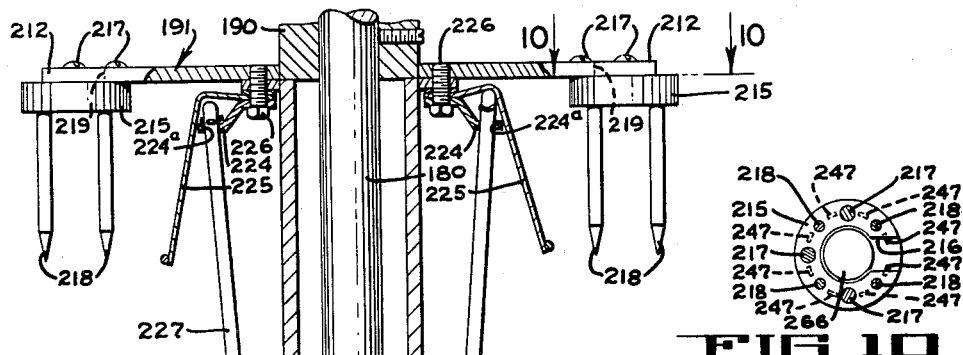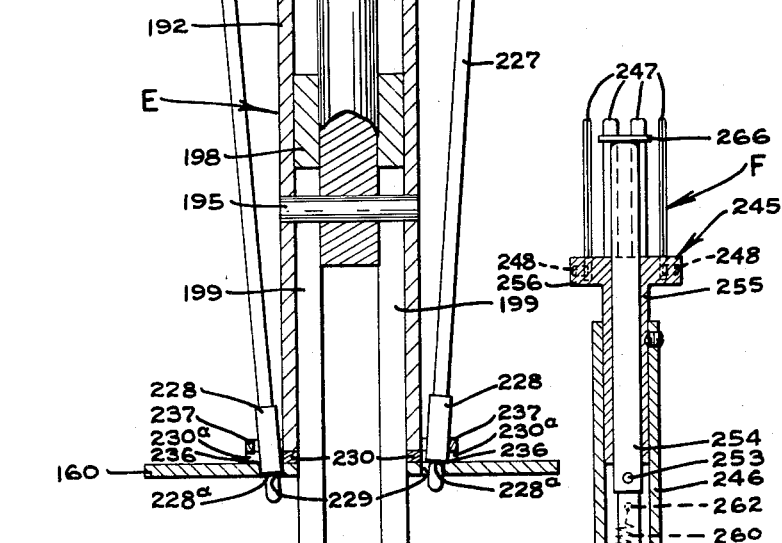

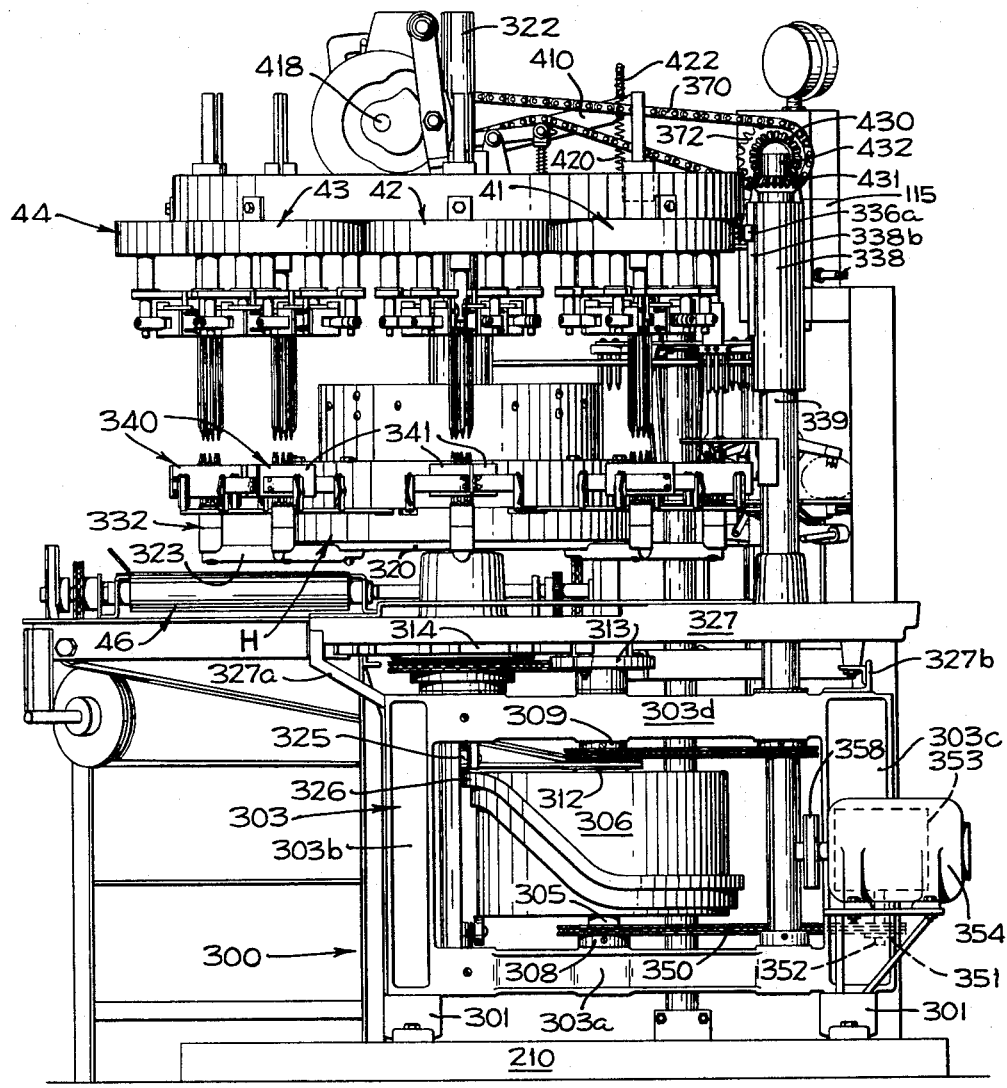

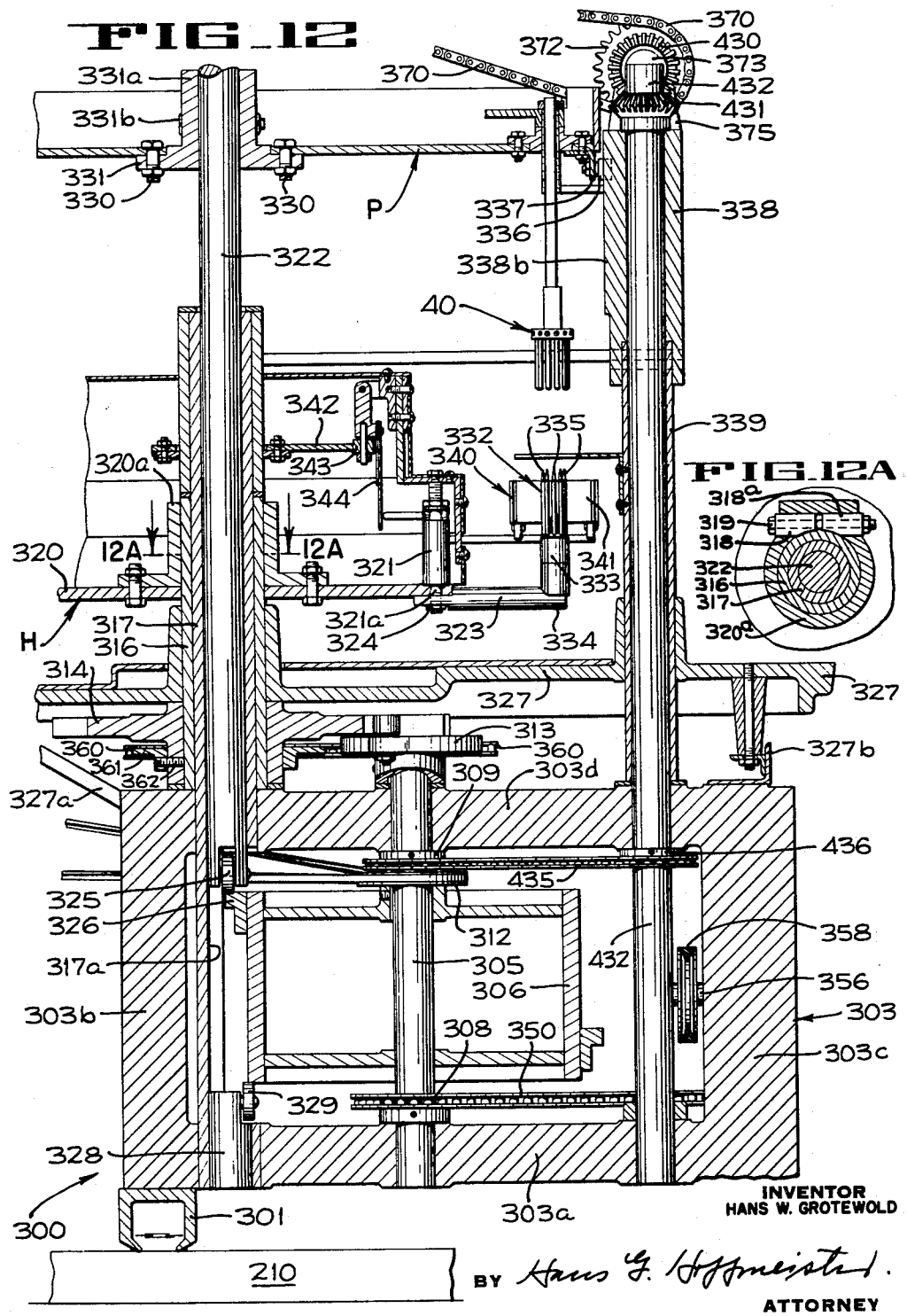

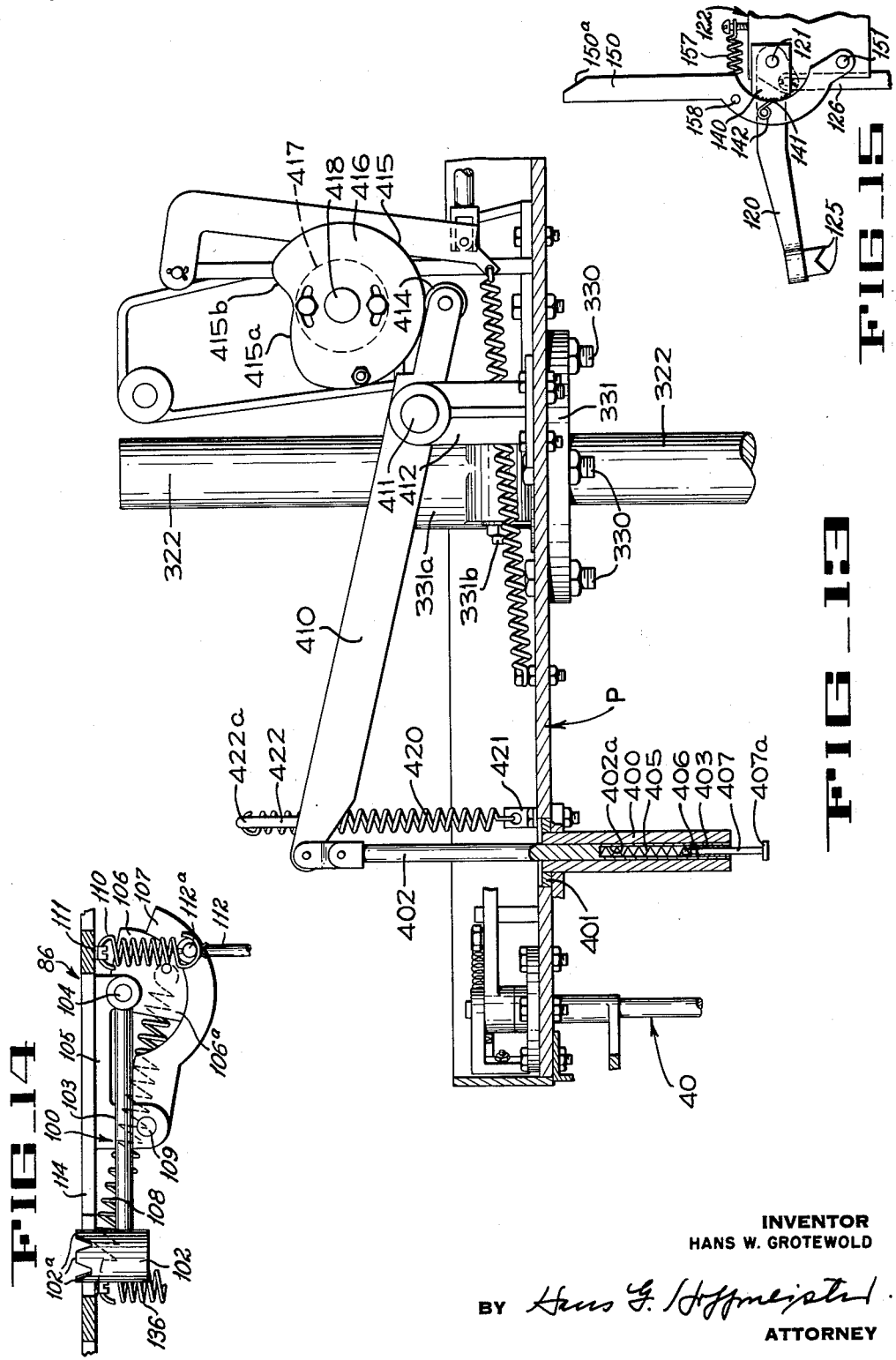

United States Patent Office 3,259,253
Patented July 5, 1966

3,259,253
FRUIT TRANSFER MECHANISM
Hans W. Grotewold, Sebring, Fla., assignor to FMC Corporation, San Jose, Calif., a corporation of Delaware
Original application Apr. 23, 1958, Ser. No. 730,335, now Patent No. 3,072,160, dated Jan. 8, 1963. Divided and this application Apr. 16, 1962, Ser. No. 187,490
11 Claims. (Cl. 214—1)

This application is a division of my pending application Serial No. 730,335, filed April 23, 1958, now Patent No. 3,072,160.

This invention pertains to the processing of citrus fruit and more particularly relates to a fruit transfer mechanism for a citrus fruit processing machine.

In fruit processing machines, such as grapefruit sectionizing machines, it is necessary that the fruit be oriented in a particular manner when it is fed into the machine, and that this orientation be maintained while the fruit is carried through the machine. Also, it is desirable that the fruit be fed into the machine at a location remote from the fruit processing and cutting tools. Accordingly means must be provided for transferring each fruit from the remote feed station to the main part of the processing machine while maintaining the same oriented position that was given to the fruit at the feed station.

It is, therefore, an object of the present invention to provide an improved transfer mechanism for a fruit processing machine.

Another object is to provide a fruit transfer mechanism capable of maintaining a predetermined orientation of the fruit as it transfers the fruit from a feed station to a fruit carrier associated with fruit processing tools of a sectionizing machine.

Another object is to provide a mechanism for transferring fruit from a feed turret to a fruit processing turret.

Another object is to provide a rotary fruit transfer turret.

Other and further objects and advantages of the present invention will become apparent from the following description taken in connection with the accompanying drawings, in which:

FIG. 1 is a perspective of the grapefruit sectionizing machine of the present invention, with parts broken away.

FIG. 2 is a plan view of the machine of FIG. 1.

FIG. 3 is an enlarged vertical section taken along line 3—3 of FIG. 2.

FIG. 4 is an enlarged fragmentary elevation of a portion of the machine of FIG. 2, taken looking in the direction of lines 4—4 of FIG. 2.

FIG. 5 is an enlarged fragmentary perspective of a portion of the feed turret shown in FIG. 4 with parts broken away and parts shown in section.

FIG. 6 is a reduced fragmentary vertical section taken along line 6—6 of FIG. 5.

FIG. 7 is a horizontal section taken along line 7—7 of FIG. 4.

FIG. 8 is a fragmentary vertical section taken along line 8—8 of FIG. 7.

FIG. 9 is an enlarged elevation of a portion of the transfer turret of FIG. 4 with parts broken away and parts shown in section.

FIG. 10 is a horizontal section taken along line 10—10 of FIG. 9.

FIG. 11 is an elevation taken looking in the direction of arrows 11—11 of FIG. 2.

FIG. 12 is an enlarged fragmentary vertical section taken along line 12—12 of FIG. 2.

FIG. 12A is a horizontal section taken one line 12A—12A of FIG. 12.

FIG. 13 is an enlarged vertical section taken along line 13—13 of FIG. 2.

FIG. 14 is an enlarged section, similar to FIG. 6, and particularly showing a brake mechanism associated with one of the turrets.

FIG. 15 is an enlarged elevation of a portion of FIG. 4.

In the grapefruit sectionizer disclosed in said parent application, peeled and treated grapefruits are advanced on a supply conveyor A (FIGS. 1 and 2) to a position within reach of an operator, who stands in front of a feed turret B and places each grapefruit on the feed turret at station C of the turret. The feed turret B is intermittently indexed through 90° angular increments in a clockwise direction (FIG. 2) to bring each grapefruit to a transfer station D where the grapefruit is automatically transferred from the feed turret B to the transfer turret E of the present invention which is also arranged to be intermittently indexed in 90° increments of synchronism with the movements of feed turret B, but in a counterclockwise direction. The grapefruit is then moved to a seed disturbing station F and then to a second transfer station G where it is deposited in one of a plurality of fruit carrier mounted on a main turret H (FIG. 1). The main turret H is arranged to be intermittently indexed through 45° angular increments in a clockwise direction to move the grapefruit successively into operative association with a second seed disturber unit 40 (FIG, 2) and with first, second, third and fourth heads 41, 42, 43 and 44, respectively, which are carried by and project downwardly from a vertically movable tool carrier or top plate P. Each head has a plurality of blades arranged to be moved down into a grapefruit to separate pie-shaped meat segments from the grapefruit core and from the radial membranes. The sectionized grapefruit with the separated segments disposed around the core is then brought under a spinner or stripper unit 45 that wraps the radial membranes around the stationary core, causing any remaining bond between the membranes and the segments to be completely broken and causing the segments to drop onto a discharge conveyor 46. The core is then moved to a position under a core stripping mechanism 47 which removes the core from the fruit carrier.

The supply conveyor A comprises an endless belt 50 (FIG. 2) disposed around an idler pulley 51 and a drive pulley 52 which is keyed to a shaft 53 suitably journalled in a support structure 54. The shaft 53 carries one element 55 of a two-piece friction clutch 56, the other element 57 being slidably journalled on an extension 53a (FIG 3) of the shaft, said extension having a collar 58 secured to its outer end. The slidable clutch element 57 has a friction face arranged to engage a similar face on the element 55. A power driven, continuously rotating sprocket 62 is formed on the clutch element 57 so that, when the two clutch elements are brought into driving engagement, the shaft 53 will be rotated to advance grapefruit on the endless belt 50 toward the delivery end of the belt. A chain 63 (FIG. 2) which is driven in a manner to be described hereinafter, is trained around sprocket 62.

The slidable clutch element 57 is moved into and out of frictional driving engagement with the element 55 by means of a solenoid 65 (FIG. 3) which is mounted on a bracket 66 secured to the conveyor support structure 54. The solenoid 65 has an actuator arm 68 provided with a forked end 68a disposed around shaft extension 53a between the collar 58 and a slidable collar 70. When the solenoid is de-energized, the solenoid plunger 65a is spring urged to the position of FIG. 3 and the upper end of the arm 68 is moved toward the left (FIG. 3) causing the slidable collar 70 to exert a force on the slidable clutch member 57 through a coil spring 71 to move the clutch elements into engagement. When the solenoid is energized, the upper end of the actuator arm 68 is moved toward the right, relieving the pressure on the slidable clutch member 57 and permitting the friction faces of the clutch members to move relative to each other.

The solenoid is connected in an electric circuit with the normally open contacts of a switch 74 (FIG. 2) which has an actuator arm 74a adapted to be engaged by a grapefruit as it arrives at the delivery end of the belt 50. The arrangement is such that the arriving grapefruit hits actuator arm 74a and closes the contacts of switch 74 to energize the circuit and deactivate the clutch and the endless belt. The endless belt will remain deactivated until the operator lifts the grapefruit away from the switch actuator arm 74a, whereby the switch contacts are automatically returned to their normally open position, de-energizing the solenoid to activate the clutch and the endless belt so that another grapefruit will be advanced to the delivery end of the belt.

The feed turret B comprises a vertical shaft 80 (FIG. 4) mounted for rotation in an elongated tubular bearing 81 which is secured to and projects through a horizontal channel 82. The channel 82 is supported at one end by the support structure of the main turret H and at the other end on a post 83 which rests on the floor. A sprocket 85 is disposed on shaft 80 and has a hub 85a by which the sprocket is keyed to the shaft. The sprocket 85 abuts the upper end of the tubular bearing 81 and thereby prevents downward movement of the shaft 80 in the bearing. A horizontal plate 86 (FIG. 4) is mounted on the shaft 80, said plate having a central portion 86a (FIG. 5) secured by capscrews 87 to a bracket 89 that is keyed to the shaft 80 by setscrews 88 and has four equi-spaced vertical recesses 89a, each recess being defined by a rear wall 89b and two spaced side walls 89c and 89d. The support plate 86 has equally spaced peripheral cutout portions 90 (FIG. 7) which divide the radially outer portion of the plate into four support arms 91. A fruit positioning unit 100 and a fruit clamping unit 101 (FIG. 5) are mounted on each of these arms. All four positioning units 100 are identical and all four clamping units 101 are identical. Accordingly, a description of one of each of these units 100 and 101 will be sufficient to disclose the structure and operation of all of the units.

Each positioning unit 100 (FIG. 5) comprises a tubular member 102 which has projections 102a on one end and is mounted on a lever 103 that is secured to one end of a shaft 104. The shaft, which is journalled for rotation in a plate 105 secured to the undersurface of the support plate 86, as seen in FIG. 6, carries a brake block 106 which has a lower surface adapted to engage a similar surface on a brake lever 107. A spring 108, that is connected between the plate 86 and the brake block 106, urges the block in a direction tending to effect clockwise pivoting of lever 103 (FIG. 6) to raise the positioning member 102. The brake lever 107 is pivotally mounted on the plate 105 by a shaft 109 and is urged upwardly toward the brake element 106 by a spring 110, connected between a stud 111 (FIG. 5) in the support plate 86 and the upper bent end 112a of a brake release rod 112 which projects through the end of the lever 107. The lever 103 is movable from a lowered position wherein it abuts a stop member formed by an extension (FIG. 6) of shaft 109 and wherein the positioning member 102 is disposed in a key-shaped opening 114 (FIG. 5) in the plate 86 to an upwardly projecting position shown in FIG. 5, with an end surface 106a of the brake block 106 abutting a stop member provided by the undersurface of the plate 86. In both the upper and lower positions the brake block 106 engages the lever 107 and is effective to hold the lever 103 in position.

When the lever 103 is in the raised position of FIG. 5, the operator places one end of a peeled grapefruit against the projections 102a and swings the member 102 downwardly to move the positioning member into the opening 114 in the plate 86 and bring the grapefruit down onto the plate 86 directly below a centering light 115 (FIG. 4). The light 115 is suitably supported from the main turret support structure by an arm 116 and so positioned that a vertical beam of light is directed downwardly toward the center of the positioning element 102 in the opening 114 in the plate. Accordingly, a spot of light is projected onto the grapefruit and, if the spot falls on the other end of the grapefruit, the stem-blossom axis of the grapefruit is in a true vertical position.

Each clamping unit 101 comprises a clamp arm 120 (FIG. 5) pivotally mounted on a pin 121 (FIG. 7) which extends between two spaced wall members 122a and 122b of a bracket 122 that is secured to the turret shaft 80 by setscrews 124 (FIG. 5). Prongs or spurs 125 are formed on the outer end of the arm 120. A downwardly projecting link 126 is pivotally connected to clamp arm 120 by a pin 127 that is fastened on the clamp arm 120 at a point spaced from the pivot pin 121. At its lower end the link 126 is pivoted on a pin 130 projecting from a lever 131 which has an inner end portion 131a (FIG. 8) pivotally mounted on a pin 132 extending between the side walls 89c and 89d of the bracket 89. A rod-like handle 135 which is secured in the outer end of lever 131, projects upwardly into the adjacent recess 90 within convenient reach of the opertaor. A spring 136 is connected between the lever 131 and the plate 86 to urge the lever upwardly to bring the clamp arm 120 to the upright position of FIG. 5. In this position, an adjustable stop bolt 138 (FIG. 8) which is threaded through an ear formed on the inner end of the lever, abuts the rear wall 89b of the associated recess 89a.

When the clamp arm 120 is moved downwardly to clamp a grapefruit against the plate 86, a brake shoe 140 (FIG. 5) which is also keyed to the same shaft 121 that carries lever 120, and has a serrated surface 140a, is swung forwardly and downwardly until one of the edges provided by the serrated surface engages a knife edge 141, formed on a lever 150 by rolling one end of a flat spring element 142 and placing it in a hole 143 of the lever 150 which is pivotally mounted on a pin 151 projecting from the bracket 122. The interengagement of the knife edge 141 and the serrated surface of the brake shoe 140 locks the clamp arm in clamped relation on the grapefruit.

As seen in FIG. 4, each lever 150 has an inclined camming edge 150a at its upper end. This edge 150a is positioned for contact by a roller 154, which is mounted on an arm 155 fixed to a bracket 156 that is carried by the top plate P for vertical movement therewith. The roller 154 is arranged to contact the camming edge and swing the lever 150 about pin 151, moving the knife edge away from the serrated surface of the brake element against the action of a spring 157 (FIG. 5) which is connected between a pin 158 on the lever 150 and the bracket 122. The spring 157 holds the lever 150 in the upright position of FIG. 5 at all times except when the lever is engaged by roller 154. It will be noted in FIG. 4 that the roller 154 on the top plate P is positioned above station D where the grapefruit GF is transferred from the feed turret B to the transfer turret E. At this station D, the grapefruit to be transferred is clamped between the clamp lever 120 and the plate 86. Accordingly, when the roller 154 is moved downwardly and engages camming edge 150a to release the brake element, the spring 136 associated with the clamping lever 120 swings the lever away from the grapefruit to its upper position unclamping the grapefruit.

Similarly, the brake lever 107 associated with each grapefruit positioning member 102 is released by a circular plate 160, which is mounted on the transfer turret E, and contacts a lever 161 that is pivotally mounted on a pin 162 welded to a plate 163 secured to the feed turret shaft 80. As will be explained presently, the plate 160 acts as a lifter member at station F and as a latch plate at stations D and G. The lever 161 is pivotally connected to the lower end of the brake release rod 112. When the circular plate 160 on the transfer turret moves downwardly and contacts the lever 161, it pivots lever 161 downwardly, causing the rod 112 to release the brake lever 107. The spring 108, associated with the lever 107, will then swing the positioning lever 102 to upright position. This release of the positioning lever 102 does not take place at the transfer station D but is effected following the next indexing movement that moves the lever away from station D.

The transfer turret E of the present invention (FIGS. 4 and 9) comprises a vertical shaft 180 which is rotatably journalled near its upper end in a bearing 181 (FIG. 4) that is welded to the bracket 156 secured to the top plate P. Collars 183 and 184 are secured by setscrews to the shaft 180 on either side of the bearing 181 so that vertical reciprocating movement of the bearing with the top plate P causes vertical reciprocation of the shaft 180. The shaft 180 extends downwardly through a hub 190 which has a prong carrier plate 191 and a depending tubular shaft 192 (FIG. 9) welded thereto. A pin 195 extends through an opening in the lower end of shaft 180 and into the side walls of the tubular shaft 192 so that the tubular shaft 192 is secured to the turret shaft 180 for vertical reciprocating movement and rotary movement. A second tubular shaft 198 is disposed between the shaft 180 and the tubular shaft 192. This shaft 198 has a pair of diametrically opposed vertical slots 199 which receive the pin 195 and permit vertical movement of the shaft 180 relative to the second tubular shaft 198. The second tubular shaft 198 is secured by setscrews to a sprocket 204 and to a lower shaft 205 which is journalled for rotation in a vertical tubular bearing member 206 that is welded in an opening in the inverted structural channel 82. Near its lower end the bearing 206 is clamped to an angle bracket 208 (FIG. 1) that is welded to one of two base channels 210 of the machine. A collar 211 is setscrewed to the lower shaft 205 at a point adjacent the lower end of the vertical bearing 206. It will be seen, therefore, that when the sprocket 204 is rotated, the shaft 198 rotates the prong carrier 191, and, when the shaft 180 is moved vertically, the prong carrier is also moved vertically.

The prong carrier 191 has four arms 212 (FIG. 2) spaced at 90° intervals around the carrier and projecting radially outwardly from the hub 190. The outer end of each arm 212 has two spaced fingers defining a generally semi-circular opening 219 (FIG. 9). A ring 215, which is secured by capscrews 217 to the under side of this outer end portion of arm 212, is provided with an opening 216 at its outermost side, and with four equally spaced, downwardly projecting prongs 218. When the tool carrier P moves downwardly the prongs 218, that are disposed above a grapefruit GF held on the feed turret B at transfer station D (FIG. 4), pierce the grapefruit. The openings in the outer end of the arm 212 and in the ring 215 are arranged to receive the outer end of the clamp arm 120, permitting the undersurface of the ring 215 to move into contact with the top surface of the grapefruit. During the last part of the downward movement of the transfer turret E, the roller 154 contacts the camming edge 150a of lever 150, swinging the lever 150 outwardly and permitting the clamp arm 120 to be swung upwardly away from the grapefruit.

A spring clamp 225 (FIG. 9) and a guide bracket 224 are secured by a capscrew 226 to the prong carrier 191 radially inwardly of each set of prongs 218. A clamp control push rod 227 is guided at its upper end in an opening 224a in the bracket 224 and, at its lower end, is provided with an elongated collar 228 which projects through an opening 229 in the plate 160 and through a slot 230a in a circular plate 230, said plates being secured in superposed relation on the lower end of the tubular shaft 192. When the turret E is near the end of the downward movement, the lower end of the push rod 227 engages a cam 234 (FIG. 4) that is secured to the upper surface of a fixed table 235 which will be described presently. The cam 234 forces the push rod upwardly, moving the upper end of the rod against the spring clamp 225, and urging the rounded lower end of the clamp against the grapefruit. The cam 234 has an inclined camming surface 234a which forces the lower end of the push rod radially outwardly away from the axis of shaft 198 to position an annular shoulder 228a (FIG. 9) on the lower end of collar 228 on a ledge 236 formed around opening 229. The resiliency of the spring clamp 225 holds the shoulder 228a on the ledge. A ring 237 prevents excessive outward movement of the rod 227. Thus, the grapefruit is held in place on the prongs, and the spring clamp is locked in clamping position by the ledge 236.

When the transfer turret E is next moved upwardly, the impaled and clamped grapefruit is carried upwardly away from support plate 86. The subsequent indexing movement of the transfer turret E brings the grapefruit to station F directly above a seed-disturbing unit 245 (FIGS. 4 and 9). The unit 245 comprises a tubular support member 246 having an inturned lower end 246a welded to the support channel 82 (FIG. 9). The tubular member 246 projects vertically upwardly in parallel spaced relation to the central turret shaft 198, and is provided with a cutout portion 246b in which a block 248 is secured by setscrew 249. The block 248 has a slanted surface 248a along which the rounded lower corner 250a of a rod 250 slides. The rod 250 has an arm 250b which projects outwardly through the cutout 246b and carries a roller 251 on a pivot pin 252 at its end portion. At its upper end, the rod 250 is pivotally connected by a pin 253 to a plunger 254 which is slidably journalled in a tubular hub 255 which is secured in fixed position in the upper end of the tubular member 246. A plurality of elongated, upwardly projecting blades 247 are secured by setscrews 248 in an upper flange 256 of the hub 255. Each blade 247 is generally rectangular in transverse cross-section being approximately 1/16 inch thick and 3/16 inch wide. As seen in FIG. 10, the blades are so positioned that two blades are in vertical alignment with a space between adjacent prongs 218 of the prong unit disposed directly above the seed disturber unit. It is to be noted that the blades 247 are relatively thin and have rounded upper edges, and their function is not to engage the seeds and push them out of the grapefruit but rather to shift the seeds sidewise and loosen the seeds from their bond with the grapefruit flesh.

The push rod 250 is urged upwardly in the tubular support member 246 by a spring 260 which, at its lower end, is hooked around a projection 252a (FIG. 4) of the pivot pin 252 and, at its upper end, in an opening 262 in the support member 246. A bracket 263 (FIG. 9) is secured to the outer surface of the tubular support member 246 and carries a roller 264 which is disposed opposite the cutout portion 246b and in the path of upward movement of the roller 251. In operation, when the transfer turret E is moved downwardly, a grapefruit, clamped on the turret and disposed at station F, is carried downwardly causing the lower surface of the grapefruit to engage and be penetrated by the seed disturbing blades 247. When the blades are a short distance in the grapefruit, the grapefruit engages a plate 266 on the upper end of the plunger 254, causing the plunger to be moved downwardly as the blades penetrate further into the grapefruit to engage and loosen the seeds disposed around the core of the grapefruit. As the plunger is moved downwardly, the lower end of the pivotal push rod 250 is cammed outwardly to a position wherein the roller 251 overlies the circular plate 160 of the transfer turret as shown in phantom lines in FIG. 9. When the transfer turret is subsequently raised, the circular plate 160 pushes upwardly on the roller 251 which, through the push rod 250 and the plunger 254, transmits this upward push to the lower end of the grapefruit whereby the hold of the seed disturber unit, on the grapefruit, due to friction and suction forces, is positively broken and the grapefruit is carried upwardly on the prongs 218. When the transfer turret E is next indexed, the grapefruit is moved to the second transfer station G where the grapefruit is transferred to the main turret H.

Referring to FIGS. 1 and 11, it will be seen that the main turret H is mounted on a base 300 comprising the two spaced base channels 210, two spaced bars 301 which extend between the channels 210 and are bolted thereto, and a vertical frame 303 which is fixed to the bars 301 and projects upwardly therefrom. The frame 303 (FIG. 11) comprises a bottom member 303a, two side members 303b and 303c and a top member 303d. A vertical shaft 305, on which a barrel cam 306 is keyed is journalled for rotation in the bottom and top members 303a and 303d. A drive sprocket 308 is keyed to shaft 305 between the lower end of the barrel cam and the bottom member 303a and a driven sprocket 309 is secured to the shaft 305 between the top of the barrel cam and the top member 303d of the support frame 303. A pulley 312 and a driver 313 of a Geneva drive mechanism are also secured to the shaft 305. The Geneva driver 313 is arranged to periodically engage and rotate a Geneva gear 314 that is keyed to a tubular shaft 316 (FIG. 12) which is rotatably journalled around a guide shaft or tube 317. Near its lower end, the second shaft 317 is fixed, as by setscrews, in both the bottom frame member 303a and the top frame member 303d. A turret plate 320 is provided with a hub 320a clamped around the tubular shaft 316 for rotation therewith by means of two gripper blocks 318 and 318a (FIG. 12A) which are slidable in a transverse opening in the hub 320a and are arranged to be forced into gripping engagement with the shaft 316 by a bolt 319. A vertically reciprocable shaft 322, which is slidable in the tubular shaft 317, carries at its lower end a roller 325 which rides along the upper surface of a cam track 326 formed on the periphery of the barrel cam 306. The lower end of the vertical shaft 322 is also slidably journalled on the inner wall of the fixed guide tube 317 which has a cut-away portion 317a into which the cam track 326 projects. A block 328 is secured in the lower portion of tube 317 and carries a roller 329 which is disposed in supporting contact with the lower surface of barrel cam 306. A table 327 is disposed immediately below the turret plate 320, being supported at opposite marginal edges by brackets 327a and 327b secured to the base frame member 303d.

The before-mentioned tool carrier or top plate P is secured by bolts 330 to a circular flange 331 that has a hub 331a clamped to the vertically movable shaft 322 by a bolt 331b which actuates gripper blocks identical to the blocks 318 and 318a of FIG. 12A. Therefore, when the shaft 322 is reciprocated in a vertical direction, as the roller 325 rides along cam track 326, the top plate P is also reciprocated vertically. The top plate is guided during its vertical reciprocating movement by two spaced rollers 336 and 336a (FIGS. 2 and 12) which are mounted on a bracket 337 secured to the top plate. The rollers ride along oppositely facing vertical, flat wall portions formed on an extended portion 338b of a tubular bearing member 338 that is supported from the base frame 303 by a tubular support member 339.

The turret plate 320 has eight upstanding posts 321 (one only being shown in FIG. 12) mounted in equally spaced relation around its outer periphery. Directly below each post 321 a support arm 323 extends radially outwardly from the under surface of the plate 320. Each post 321 and its associated support arm 323 are held in fixed position by a nut 324 that is threaded on a stud 321a projecting downwardly from the post through suitable openings in the plate and in the support arm. A fruit carrier unit 332 is mounted on the outer end of each support arm, said unit comprising an upstanding prong holder 333 which is secured by a capscrew 334 to the outer end of the arm 323. Two concentric circles of prongs 335 are fixed in and project upwardly from the prong holder 333.

A fruit clamping mechanism 340 is associated with each fruit carrier 332. In general, each clamping mechanism comprises a pair of semi-cylindrical bands 341 of yieldable material, such as rubber, that are urged into gripping engagement with a fruit on the support prongs of holder 333 by means of a cam plate 342 (FIG. 12) which is arranged to engage a follower roller 343 carried by a lever system 344 which controls the movement of the bands 341 into and out of gripping engagement with the fruit. The clamping bands hold the fruit in compact form as it is carried to the various processing stations of main turret H.

Referring again to FIG. 4, it will be seen that when a grapefruit GF is carried to transfer station G by the transfer turret, the grapefruit is held in clamped position directly above a fruit carrier 332 of the main turret H. When the top plate P is moved downwardly, the grapefruit, which is still impaled on prongs 218, is then impaled on the prongs 334 of the carrier 332 also. The prongs 218 are so spaced that they assume a position radially outwardly of the circular rows of prongs 335. Just before the end of the downward movement of the transfer turret, the lower end of clamp control push rod 227 engages a cam 385 (FIG. 4) which is arranged to cam the push rod radially inwardly to slide the annular shoulder 228a of collar 228 off the ledge on which it is disposed, thereby releasing the spring clamp 225 from clamping engagement with the grapefruit.

A grapefruit hold-down mechanism is mounted on the top plate of P at station G for the purpose of holding the grapefruit down on the prongs 335 of the fruit carrier of the main turret while the prongs 218 of the transfer turret are moved vertically upwardly out of the grapefruit. This hold-down mechanism comprises a downwardly projecting guide tube 400 which is mounted in fixed position in a hub 401 of the support bracket 156 (FIG. 4) and a push rod 402, which is slidable in the guide tube 400 and has a cylindrical chamber 402a (FIG. 13) in its lower end portion that is partially closed by a bushing 403 secured therein. A spring 405 is disposed between one end wall of the chamber and a nut 406 threaded on the end of a pin 407 that is slidable in the bushing 403 and has a lower circular fruit-contacting head 407a. At its upper end, the push rod 402 is pivotally connected to a lever 410 that is pivotally mounted by means of a pin 411 on the upper end of a support member 412 fixed to the top plate P. A roller follower 414, that is rotatably mounted on lever 410, rides along the peripheral camming surface 415 of a cam 416 which is adjustably secured to a hub 417 keyed to a power driven shaft 418 extending across the top plate P. A tension spring 420 is connected between the bracket 421 secured to plate P and the hooked upper end 422a of a rod 422 that is secured to and projects upwardly from the lever 410. The cam 416 rotates in a counterclockwise direction and, when the roller follower 414 rides along a portion 415a of the camming surface 415, the spring 420 is allowed to pivot the lever 410 counterclockwise and move the push rod 402 downwardly at a relatively slow speed. During this downward movement, the plate 407a contacts the top surface of a grapefruit that is held at transfer station G by the prongs 218 and 335. When the plate 407a contacts the grapefruit, the spring 405 is compressed. The camming surface of cam 416 is so arranged that the hold-down plate exerts a downward pressure on the grapefruit until the upwardly moving prongs 218 have cleared the upper end of the grapefruit. Then the follower 414 engages a camming surface 415b which pivots lever 410 and quickly raises the hold-down plate 407a, leaving the grapefruit impaled on the prongs 335 of the fruit carrier 332 of the main turret.

The drive mechanism of the grapefruit sectionizing machine will be described with particular reference to FIGS. 11 and 12. The shaft 305 to which the barrel cam 306 is keyed is continuously rotated by a chain 350 which is trained around sprocket 308 and around a sprocket 351 keyed to an output shaft 352 of a transmission unit 353. A motor 354 is connected in driving engagement to an input shaft 356 (FIG. 12) of the transmission by a belt and pulley drive 358. Since the shaft 305 not only drives the barrel cam which controls vertical reciprocation of the top plate P but also drives the Geneva mechanism 313–314 which effects intermittent indexing of the main turret H, it is evident that the vertical reciprocation of the top plate P and the indexing of the main turret are carried on in timed relation.

Similarly, the indexing movements of the feed turret B and the transfer turret E are coordinated with the indexing movements of the main turret H by means of a chain 360 (FIG. 12) which is trained around a sprocket 361, secured by a setscrew 362 to the turret shaft 316, and around the sprockets 85 and 204 (FIG. 4) which are fixed to the feed turret shaft 80 and the transfer turret shaft 198, respectively. The sprockets are so designed that a 45° rotation of sprocket 361 causes a 90° rotation of each of the sprockets 85 and 204.

The drive shaft 418, which extends across the top plate P and carries cam 416, is driven by a chain 370 (FIGS. 1 and 11) that is trained around a sprocket 371 keyed to shaft 418 and around a sprocket 372 keyed to a shaft 373. As seen in FIG. 2, the shaft 373 is journalled for rotation in a bearing 374 that is supported by a flange 375 (FIGS. 2 and 12) carried by the tubular bearing 338. A bevel gear 430, which is keyed to a shaft 373, is in mesh with a second bevel gear 431 keyed to a vertical shaft 432 that is journalled for rotation in the tubular bearing 338, the support tube 339 and the base 303. The vertical shaft 432 is driven by a chain 435 trained around a sprocket 436 keyed to shaft 432 and around the sprocket 309 keyed to the main turret shaft 305.

The operation of the machine will be explained with particular reference to FIGURES 1 and 2. When the various units are all operating, a peeled grapefruit is advanced to the discharge end of feed conveyor A where it contacts and closes switch 74 (FIG. 2), deactivating the clutch 56 and stopping the feed conveyor. The operator lifts the grapefruit off the conveyor and places it on the upstanding positioning member 102 of feed turret B with one end of the peeled grapefruit in contact with the projections 102a. The grapefruit is then swung downwardly with the positioning member to bring the grapefruit under the centering light 115. When the grapefruit is centered, the operator actuates the handle 135 and swings the clamp arm 120 into clamping engagement with the top of the grapefruit.

The next two indexing movements of feed turret B bring the clamped grapefruit to transfer station D where a set of prongs on the overhead prong carrier plate 191 of transfer turret E are moved downwardly to pierce and grip the grapefruit. During this downward movement of the carrier the spring clamp 225, associated with the particular set of prongs, is moved into gripping engagement with the side of the grapefruit. Also, during the downward movement of the prong carrier of the transfer turret, the roller 154 (FIG. 1) releases the brake associated with the clamp arm 120, permitting the arm 120 to be swung upwardly away from the grapefruit. When the prong carrier plate 191 is next moved upwardly, the grapefruit, which is clamped on the prongs by the spring clamp, is also raised upwardly away from the feed turret B.

The next indexing movement of the transfer turret E brings the elevated grapefruit into position at station F above the first seed distruber unit 245. As the prong carrier of transfer turret E moves downwardly, the relatively thin blades of the seed disturber penetrate the grapefruit close to the core and contact and loosen the seeds from the flesh of the grapefruit. The clamped grapefruit is then carried upwardly away from the seed disturber and, when the transfer turret E is next indexed, the grapefruit is positioned at station G above a fruit carrier of the main turret H.

At station G (FIG. 4) the clamped grapefruit is carried down onto the prongs 335 of the fruit carrier 332 of the main turret and, during the next upward movement of the top plate P, the hold-down member 407 holds the grapefruit in the fruit carrier while the prongs on the transfer turret are lifted out of the grapefruit.

From the foregoing description it will be recognized that the present invention provides an efficient fruit feeding and transferring mechanism that is particularly adapted to maintain the orientation of an object from the time it is placed on the machine until it is transferred to a main processing turret.

It will be understood that modifications and variations may be effected without departing from the scope of the novel concepts of the present invention.

Having thus described my invention, what I claim as new and desire to protect by Letters Patent is:

1. In a fruit processing machine, a fruit transfer mechanism comprising a horizontal fruit support plate having an aperture therein, a fruit positioning member having fruit gripping members projecting upwardly through said aperture to engage and hold a fruit against movement laterally on said plate, a clamping lever pivotally mounted above said plate and having an end portion arranged to be moved into engagement with the top surface of a fruit held on said plate by said fruit gripping members, a plurality of impaling members mounted above said fruit positioning member, means mounting said impaling members for movement downwardly into engagement with the fruit held by said clamping lever, said impaling members being arranged to move down into the fruit on opposite sides of the fruit-engaging end portion of said clamping lever, and means movable in timed relation with said impaling members for swinging said lever upwardly away from the fruit after said impaling members have entered the fruit.

2. In a fruit processing machine, a fruit transfer mechanism comprising a fruit support plate mounted for rotation about a vertical axis, a fruit positioning member mounted on said turret, clamp means arranged to engage the top of a fruit disposed on said positioning member and clamp the fruit in place on said plate, a fruit impaling unit, means mounting said unit for movement from an elevated position above a fruit on said positioning member downwardly into the fruit, and means responsive to downward movement of said impaling unit and operatively connected to said clamp means to release said clamp means, whereby the fruit will be lifted away from said plate by said impaling unit when said unit is returned to elevated position.

3. In a fruit processing machine, a fruit transfer device comprising a fruit support member, a fruit carrier disposed directly above said support member and including means for holding a fruit suspended above said support member, means for moving said carrier downwardly to position the fruit on said support member and then moving said carrier upwardly away from said support member, and hold down means movable into engagement with the upper surface of a fruit positioned on said fruit support member by said carrier, said hold down means being effective to retain the fruit on said support member during subsequent upward movement of said carrier.

4. In a fruit processing machine, a fruit transfer mechanism comprising a fruit support member, a prong carrier mounted for vertical reciprocating movement toward and away from said support member, a prong support member mounted on said carrier and having a generally U-shaped portion directly above said support member, a plurality of prongs depending from said U-shaped portion and adapted to hold a fruit in position directly above said fruit support member, a tool carrier mounted for vertical reciprocating movement above said prong carrier, drive means for reciprocating said tool carrier and said prong carrier to move said prong carrier downwardly to position a fruit on said fruit support member and then raise said prongs away from said fruit support member, a hold down rod mounted on said tool carrier in vertical alignment with the opening between arms of said U-shaped portion and arranged for bodily movement with said tool carrier and slidable movement relative thereto, said hold down rod being movable downwardly with said tool carrier to a position adjacent to the top of a fruit positioned by said prongs on said fruit support member, actuating means operatively connected to said hold down rod and operating in timed relation with said drive means, said actuating means being effective to move said hold down rod downwardly through the opening in said U-shaped portion to engage the fruit held in said fruit support and to maintain said rod in engagement with the fruit as said prong carrier is raised by said drive means whereby said prongs are lifted out of the fruit and the fruit is retained on said support member.

5. In a fruit processing machine, a fruit transfer mechanism comprising a fruit support member, a fruit carrier disposed directly above said support member, releasable means for holding a fruit on said carrier, drive means for vertically reciprocating said fruit carrier to move said carrier downwardly to position the fruit on said fruit support member and then raise said fruit carrier away from said support member, a hold down member connected to said carrier for vertical movement therewith and for vertical movement relative thereto and disposed in vertical alignment with said carrier and said support member, said hold down member being movable downwardly with said carrier to a position spaced above the fruit positioned in said support member by said carrier, and an actuating mechanism operating in timed relation with said drive means and connected to said hold down member to move said member downwardly relative to said carrier into engagement with the top of the fruit in said support member, said actuating mechanism being effective to maintain said hold down member in contact with the fruit while said carrier is lifted upwardly away from said support member by said drive means.

6. In a fruit processing machine, a fruit transfer mechanism comprising means for supporting a fruit in fixed position, fruit impaling members disposed above a fruit on said support means, means for moving said impaling members downwardly into the fruit, a flat spring member mounted for movement with said impaling members and being disposed to engage the side of a fruit on said support means as said impaling members penetrate into the fruit whereby to be moved to a stressed position resiliently locking the fruit between said impaling members and said spring member, and means for raising said impaling members and said spring member to lift the locked fruit from said fruit supporting member.

7. In a fruit processing machine, a fruit transfer mechanism comprising means for supporting a fruit in fixed position, a prong carrier mounted for vertical movement, a fruit impaling prong unit mounted on said carrier above a fruit on said fruit support means and arranged to be moved downwardly into the fruit as said carrier is moved downwardly, a flat spring mounted on said carrier and having one end secured to said carrier and a free end disposed alongside said impaling unit, an apertured latch plate disposed below said prong carrier and mounted for movement therewith, a push rod having an upper end disposed adjacent the undersurface of said spring intermediate its length and a lower end projecting through the aperture in said latch plate, means providing a shoulder on said push rod adjacent the lower end thereof and normally disposed in the aperture in the latch plate, means for moving said prong carrier downwardly to position said impaling unit inside the fruit on said support means, a cam mounted in fixed position below said latch plate in the path of downward movement of said push rod, said cam being positioned to be engaged by the lower end of said push rod after said impaling unit penetrates the fruit, means providing a camming surface on said cam arranged to move said rod upwardly causing the upper end of the rod to engage said spring and move the free end of the spring against the fruit, said camming surface also being arranged to position the shoulder of said push rod on the ledge provided on the upper surface of said latch plate around the aperture therein.

8. In a fruit processing machine, a turret comprising means for supporting a fruit in fixed position, fruit impaling tines mounted above a fruit held in fixed position on said support means, means mounting said tines for movement downwardly into penetrating engagement with the fruit, a spring mounted alongside said tines and movable therewith and having a free end portion arranged to engage the side surface of a fruit on said impaling tines, said spring being arranged to be moved to stressed position resiliently locking the fruit between said gripping tines and said spring, an apertured latch plate mounted in fixed position below said tines, and a push rod projecting through the aperture in said fixed latch plate and having an upper end arranged to engage the undersurface of said spring member to urge the free end of said spring against the fruit during downward movement of said tines, means providing a shoulder on said rod near the lower end thereof, and cam means disposed in the path of movement of the lower end of the push rod to be contacted thereby, said cam means being designed to lift said push rod upwardly and to move it laterally to position the shoulder of the push rod on a ledge provided on the upper surface of said latch plate around the edge of the aperture in the plate.

9. In a fruit processing machine the combination of a fruit support plate having an aperture and adapted to receive a fruit, a releasable clamp mounted on said plate and arranged to grip a fruit on said plate over said aperture, a fruit carrier disposed adjacent to but spaced from said support plate, upwardly projecting tines on said carrier, a vertically movable prong carrier plate having a first set of depending prongs directly above the aperture in said fruit support plate and a second set of prongs directly above said fruit carrier, a spring clamp carried on the underside of said prong carrier adjacent each set of prongs, each of said spring clamps having a portion movable when actuated toward or away from the associated prongs to clamp or release a fruit carried thereon, means for moving said prong carrier downwardly to move said first set of prongs into engagement with a fruit held in position on said fruit support plate by said releasable clamp and to move a fruit carried on said second set of prongs downwardly into impaled engagement with the upwardly projecting tines in said fruit carrier, means responsive to the downward movement of said prong carrier for moving the spring clamp associated with said first set of prongs into gripping engagement with the fruit on said support plate, means responsive to downward movement of said prong carrier for moving the spring clamp associated with said second set of prongs away from the fruit carried on said prongs, an actuating mechanism carried by said prong carrier and movable into engagement with said releasable clamp to release said clamp as said first set of prongs impale the fruit engaged by said releasable clamp, a hold down member movable downwardly with said prong carrier to a lowered position to engage the top surface of the fruit held on the second set of prongs and on the tines of said fruit carrier, means for raising said prong carrier to elevate the fruit clamped on said first set of prongs, and means for maintaining said hold down member in lowered position during raising of said prong carrier to retain the fruit on said tines as said second set of prongs is elevated away from the fruit on said tines.

10. In a fruit processing machine of the type having a support means on which fruit may be held in fixed position, a transfer turret mounted adjacent said fruit support means for rotation about a vertical axis and for vertical reciprocating movement, a plurality of fruit impaling units mounted in spaced relation on said transfer turret at an elevation higher than the elevation of said fruit support members, means for indexing said transfer turret through predetermined angular movements to successively move each impaling unit on said transfer turret to a position in vertical alignment with a fruit held on said support means, the improvement which comprises actuating means for moving said transfer turret in a vertical direction to move an impaling unit downwardly into contact with a fruit on said fruit support means, and spring means associated with each impaling unit and arranged to cooperate therewith incident to downward movement of said transfer turret to automatically grip the fruit upon being moved into contact therewith, whereby when said transfer turret is moved upwardly by said actuating means the fruit will be lifted from said fruit support means.

11. In a fruit processing machine, a fruit transfer mechanism comprising means for supporting a fruit in fixed position, fruit impaling members disposed above a fruit on said support means, means for moving said impaling members downwardly into the fruit, a spring member mounted for movement with said impaling members and being movable to a position alongside the side of a fruit on said support means as said impaling members penetrate into the fruit, means for engaging said spring member and moving it to a stressed position resiliently locking the fruit between said impaling members and said spring member, and means for raising said impaling members and said spring member to lift the locked fruit from said fruit supporting member.

References Cited by the Examiner
UNITED STATES PATENTS

| | | | |
|---|---|---|---|
| 305,280 | 9/1884 | Boutell | 146—36 |
| 915,658 | 3/1909 | Burns | 146—34 |
| 1,197,801 | 9/1916 | Curry | 294—100 |
| 1,626,410 | 4/1927 | Halstead. | |
| 2,038,518 | 4/1936 | Badger. | |
| 2,331,905 | 10/1943 | Halstead. | |
| 2,398,922 | 4/1946 | Coons. | |
| 2,417,472 | 3/1947 | Dorff | 198—210 |
| 2,447,640 | 8/1948 | Dunn | 146—33 |
| 2,468,255 | 4/1949 | Dunn | 146—51 |
| 2,526,712 | 10/1950 | Thompson | 146—51 X |
| 2,609,943 | 9/1952 | Winder. | |
| 2,692,669 | 10/1954 | Slagle | 198—178 X |
| 2,695,504 | 11/1954 | Magee | 64—23 |
| 2,742,141 | 4/1956 | Ovellette | 198—210 |
| 2,843,251 | 7/1958 | Hoffman et al. | 198—178 |
| 3,018,007 | 1/1962 | Williams. | |

GERALD M. FORLENZA, *Primary Examiner.*

MORRIS TEMIN, HUGO O. SCHULZ, *Examiners.*